United States Patent [19]
Perrotti et al.

[11] 3,940,858
[45] Mar. 2, 1976

[54] METHOD OF MEASURING ANTENNA REFLECTOR SURFACE ACCURACY

[75] Inventors: Emmanual J. Perrotti, Ramsey; Donald Roy Leger, East Hanover, both of N.J.

[73] Assignee: International Telephone and Telegraph Corporation, Nutley, N.J.

[22] Filed: Apr. 28, 1975

[21] Appl. No.: 572,353

[52] U.S. Cl............... 33/228; 33/174 G; 33/275 R; 33/293; 356/237
[51] Int. Cl.² ................. G01N 21/00; G01C 15/00
[58] Field of Search ........ 33/275, 293, 228, 174 G, 33/174 A; 356/124, 237

[56] References Cited
UNITED STATES PATENTS

| | | | |
|---|---|---|---|
| 944,462 | 12/1909 | Osborne | 33/174 G |
| 3,106,782 | 10/1963 | Carroll | 33/293 |
| 3,352,014 | 11/1967 | Kehke | 33/228 |
| 3,803,626 | 4/1974 | Garrett | 356/237 |
| 3,848,339 | 11/1974 | Strasbaugh | 33/174 A |

*Primary Examiner*—Richard E. Aegerter
*Assistant Examiner*—Steven L. Stephan
*Attorney, Agent, or Firm*—John T. O'Halloran; Menotti J. Lombardi, Jr.; Alfred C. Hill

[57] ABSTRACT

The antenna reflector whose surface is to be measured is mounted on a moderately level surface. A relatively thin full diameter template is located sequentially at n different locations in the antenna reflector. Spacers are disposed between the template and the reflector surface at each of the n locations. A graduated target is mounted on the template at the central vertical axis of the reflector. A bench scope is supported and levelled on a table disposed a convenient distance from the target and sighted at the target at each of the n locations. At each of the n locations a height reading is made and measurements of the spacing between the template and reflector surface are made at m intervals along the template. These readings and measurements are recorded in a matrix of n rows and ($m + 1$) columns. The change in height reading is calculated for each position of the template and used to weight the associated m spacing measurements. The height readings and weighted spacing measurements are employed in a number of equations to obtain the root mean square error of the reflector surface.

12 Claims, 3 Drawing Figures

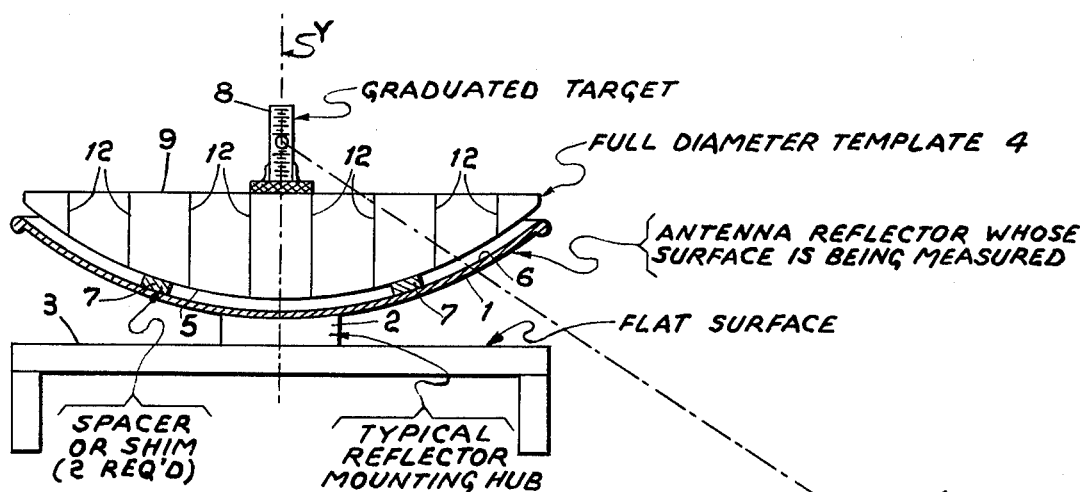
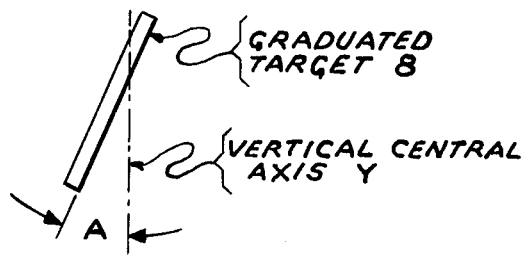
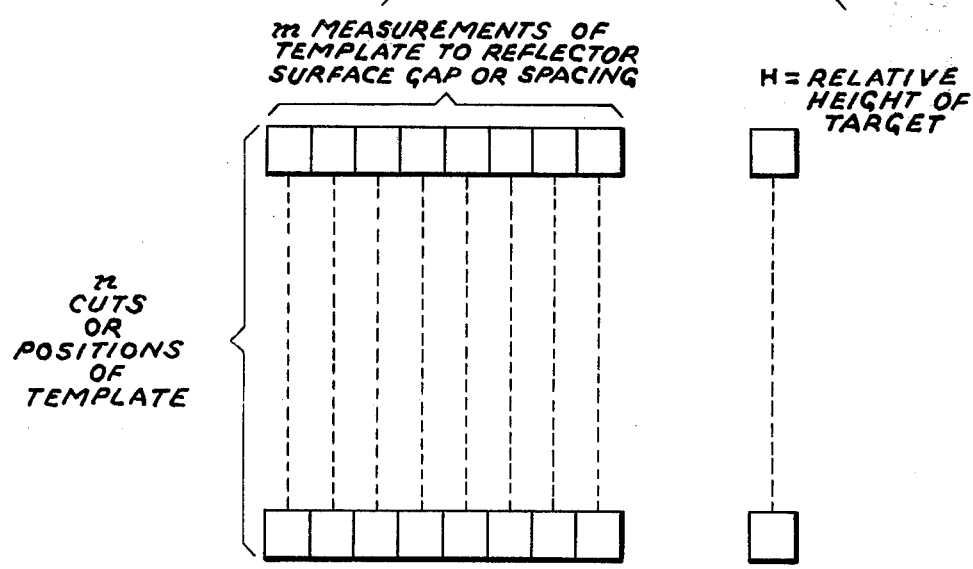

METHOD OF MEASURING ANTENNA REFLECTOR SURFACE ACCURACY

BACKGROUND OF THE INVENTION

This invention relates to antenna reflectors and more particularly to a method of measuring the accuracy of an antenna reflector surface.

It is well known in the electronics industry that accurate antenna reflector surfaces are required to form antenna beams with maximum efficiency and minimized side lobes. The ability to obtain the required accuracy becomes more difficult at higher frequencies and in particular in the microwave region on up. Antenna reflector manufacturers strive to obtain accurate reflector surfaces, but it then becomes necessary to measure the surface accuracy to evaluate their efforts and to project electrical performance. Various optical and mechanical means of measurement have been devised to obtain RMS (root-mean-square) surface errors, but in all known methods to date, a relatively elaborate, expensive and time consuming process is involved. In many of these methods, the usual procedure involves the utilization of a template having a curved edge conforming to the desired curvature of the reflector surface. Preferably the template is a full diameter template rather than a radial template. Great care is taken to mount the template over the reflector surface and both the reflector diameter plane and the template diameter plane must be very carefully levelled. This relationship must then be maintained as the template is revolved in order to measure the surface deviation from the curved edge of the template. It is, therefore, necessary to construct an accurate fixture which employs precision bearings. The measurements are then taken with feeler type gauges.

To simplify matters, attempts have been made to measure the RMS surface error by laying the template on the surface and obtain data by utilizing feeler gauges. This method is simple but it can produce errors in the RMS surface error determination of greater than 50% of the true value. A major cause of this error is the fact that the rise and fall of the template with rotation is not detected or taken into account. The surface accuracy will then appear better than it actually is.

SUMMARY OF THE INVENTION

An object of the present invention is to provide a method of measuring the accuracy of antenna reflector surfaces that overcome the disadvantages of the above-mentioned prior art methods.

Another object of the present invention is to provide a method of measuring the accuracy of an antenna reflector surface that is economical, rapid and accurate.

Still another object of the present invention is to provide a method of measuring the accuracy of an antenna reflector surface that has an accuracy comparable to the more expensive precision bearing technique, while at the same time provide the simplicity and expedience of the more inaccurate method mentioned hereinabove.

A feature of the present invention is the provision of a method of measuring antenna reflector surface accuracy comprising the steps of: (a) mounting the antenna reflector whose surface is to be measured on a moderately level surface; (b) centrally locating a relatively thin full diameter template having a curved edge conforming to the desired curvature of the reflector surface and a straight edge in the antenna reflector at a selected location; (c) placing spacers of selected thickness between the curved edge and the reflector surface to space the curved edge from the reflector surface a given amount; (d) mounting a graduated target on the straight edge at the central vertical axis of the antenna reflector; (e) supporting a bench scope on a table disposed at a convenient distance from the target; (f) levelling the bench scope on the table; (g) aiming the bench scope at the target; (h) reading from the target by employing the bench scope a height at the selected location; (i) measuring the spacing between the curved edge and the reflector surface at $m$ intervals along the template at the selected location, where $m$ is an integer greater than one; (j) repeating steps (b), (c), (g), (h) and (i) for $(n - 1)$ other different positions of the template; where $n$ is an integer greater than one; (k) recording the $n$ height readings and the $m$ spacing measurements of steps (h), (i) and (j) in the form of a matrix having $n$ rows corresponding to the $n$ positions of the template and $(m + 1)$ columns corresponding to the $m$ spacing measurements and the height reading for each of the $n$ positions of the template; (l) calculating an average template height from each of the $n$ height readings; (m) calculating a change in template height for each of the height readings from the height reading for each of a particular row of the matrix and the average template height; (n) weighting the $m$ spacing measurements of each of the $n$ rows of the matrix by an associated one of the change in template heights; (o) calculating an average of the $m$ weighted spacing measurement from the $m$ weighted spacing measurements for each of the $n$ rows of the matrix; (p) calculating a change in spacing between the curved edge and the reflector surface for each of the $m$ weighted spacing measurement in each of the $n$ rows of the matrix from each of the $m$ weight spacing measurements in each of the N rows of the matrix and the average of the $m$ spacing measurements; and (q) calculating the surface accuracy by calculating a root mean square reflector surface error from the change in spacing.

BRIEF DESCRIPTION OF THE DRAWING

Above-mentioned and other features and objects of this invention will become more apparent by reference to the following description taken in conjunction with the accompanying drawing, in which:

FIG. 1 is a schematic illustration of the setup for measuring the accuracy of an antenna reflector surface in accordance with the principles of the present invention;

FIG. 2 is a schematic illustration of the relationship between the graduated target of FIG. 1 when it is not aligned with the central vertical axis of the antenna reflector; and FIG. 3 is a schematic illustration of the manner in which the height reading and antenna reflector surface spacing measurements are recorded in accordance with the principles of the present invention.

DESCRIPTION OF THE PREFERRED EMBODIMENT

Referring to FIG. 1, there is illustrated therein the setup to make the RMS surface area determination in accordance with the principles of the present invention. The antenna reflector 1 whose surface is to be measured is mounted with its mounting hub 2 on a flat surface 3 which is only moderately level. Surface 3 does not have to be perfectly level. A relatively thin full diameter template 4 having a curved edge 5 conforming to the desired curvature of the reflector surface 6 of reflector 1 is centrally located in reflector 1 at a selected location. Template 4 is located above surface 6 by means of spacers or shims 7. The thickness of spacers 7 should be kept to a minimum such that template 4 can just be rotated into any position without template 4 hitting a high spot on reflector surface 6. It is important to minimize the spacer thickness because excessive thickness will reduce the accuracy of the measurement. A graduated target 8, such as a K & E (Keuffel & Esser) scale is mounted on the straight edge 9 of template 4 and is located at the central vertical axis Y of reflector 1. It is important that the target not be moved from this location throughout a measuring run.

A bench scope 10 is supported on a table 11 at a convenient distance from target 8. It is important in the method of this invention that scope 10 and table 11 not be moved relative to target 8 during a measuring run. The bench scope may be a K & E bench scope No. 71-3010.

The method of measuring the accuracy of an antenna reflector surface in accordance with the principles of the present invention is as follows:

1. Level bench scope 10 on its table 11 and do not upset levelling for the entire measuring run.
2. Centrally locate template 4 with spacers 7 inside reflector surface 6 at a selected location either with reference to the central hub 2 or the edge of reflector surface 6. This centering can be done by eye or with the aid of a fixed reference or spacer gauge.
3. With template 4 positioned for the selected location or cut aim bench scope 10 at target 8 and read the height which may be a reference height to compare to height readings at other positions or cuts of template 4. The first height reading is chosen arbitrarily as the reference height. It should be noted that the only error besides the resolution in the bench scope 10 reading encountered in the height measurement will result from target 8 not being perpendicular, or in other words, not aligned with center axis Y as indicated in FIG. 2. This situation can be present if one of the spacers 7 is on a "bump" in reflector surface 6. The height reading in this case will depend on cos A as illustrated in FIG. 2. For a vast majority of measuring cases, angle A is equal to or less than 9°, which means that the height reading will be off by no more than 1% which is sufficiently accurate. Much finer accuracy can be obtained by levelling target 8 with the aid of the vertical cross hair of bench scope 10, or dividing the height reading by cos A. The levelling of target 8 can be done in a few minutes, but as stated previously, it is not necessary. It should be noted that if extreme accuracy is needed, the division of the reading made by the scope divided by cos A can be accomplished if the scope can read angles under these conditions; namely, TRUE HEIGHT = (Scope reading/cos A)  (1)

4. Measure the spacing between the curved surface 5 of template 4 and reflector surface 6 at either $m$ random intervals or prescribed $m$ constant intervals 12 along template 4 and, hence, the diameter of reflector surface 6 at the selected position. For reflectors of approximately 6 feet in diameter, $m$ can equal 8 if template 4 is positioned at $n$ positions with adjacent ones of the $n$ positions being separated by 30°. Thus, $n$ is equal to 12 and there are 96 spacing measurements in all to be made.

5. Repeat steps (3) and (4) for $(n-1)$ other different positions of template 4 and record the height reading and spacing measurements in the form of a matrix having $n$ rows corresponding to the $n$ positions of template 4 and $(m + 1)$ columns corresponding to the $m$ spacing measurements and the associated height reading for each of the $n$ positions of template 4 as illustrated in FIG. 3.

6. Calculate the average target height $H_{av}$ by employing the following equation:

$$H_{av} = \sum_1^n \frac{H_i}{n} \qquad (2)$$

where $H_i$ is equal to any one of the recorded target heights.

7. Calculate the rise or fall $\Delta H_j$ of template 4 employing the following equation:

$$\Delta H_j = \sum_1^n \frac{H_i}{n} - H_j \qquad (3)$$

where $H_j$ is equal to any particular height for which the $\Delta$ from the average height must be found.

8. Weight all spacing measurements in a particular row (the $j^{th}$ row for example) by $\Delta H_j$. This is done by direct addition or subtraction of $\Delta H_j$ to all $m$ measurements in the $j^{th}$ row. It should be noted that the sign of $\Delta H_j$ is (+) when $H_j$ is less than $H_{av}$ and (−) when $H_j$ is greater than $H_{av}$.

9. Repeat step (8) for all rows.

10. Calculate the average spacing $S_{av}$ between the curved surface 5 of template 4 and reflector surface 6 by employing the following equation:

$$S_{av} = \sum_1^{n \times m} \frac{S_{ij}}{n \times m} \qquad (4)$$

where $S_{ij}$ is equal to the weighted spacing measurement in the $i^{th}$ row and the $j^{th}$ column.

11. Calculate the change in the spacing measurements $\Delta S$ by employing the following equation:

$$\Delta S = \sum_1^{n \times m} \frac{S_{ij}}{n \times m} - S_{ij} \qquad (5)$$

12. Calculate the surface accuracy by calculating the RMS reference surface error $\sigma$ by the following equation:

$$\sigma = \left[ \frac{\sum_1^{n \times m} \left( \sum_1^{n \times m} \frac{S_{ij}}{n \times m} - S_{ij} \right)^2}{n \times m} \right]^{1/2} \qquad (6)$$

The total time elapsed to take 96 readings and determine the RMS surface error of a 6 foot diameter reflector surface using the method of this invention and a desk top calculator was approximately one hour. This time did not include the initial set up time of the reflector 1 and bench scope 10.

While we have described above the principles of our invention in connection with specific apparatus it is to be clearly understood that this description is made only by way of example and not as a limitation to the scope of our invention as set forth in the objects thereof and in the accompanying claims.

We claim:
1. A method of measuring antenna reflector surface accuracy comprising the steps of:
    a. mounting said antenna reflector whose surface is to be measured on a moderately level surface;
    b. centrally locating a relatively thin full diameter template having a curved edge conforming to the desired curvature of said reflector surface and a straight edge in said antenna reflector at a selected location;
    c. placing spacers of selected thickness between said curved edge and said reflector surface to space said curved edge from said reflector surface a given amount;
    d. mounting a graduated target on said straight edge at the central vertical axis of said antenna reflector;
    e. supporting a bench scope on a table disposed at a convenient distance from said target;
    f. levelling said bench scope on said table;
    g. aiming said bench scope at said target;
    h. employing said bench scope to read a height from said target with said template at said selected location;
    i. measuring the spacing between said curved edge and said reflector surface at $m$ intervals along said template at said selected location, where $m$ is an integer greater than one;
    j. repeating steps (b), (c), (g), (h) and (i) for $(n-1)$ other different positions of said template, where $n$ is an integer greater than one;
    k. recording said $n$ height readings and said $m$ spacing measurements of steps (h), (i) and (j) in the form of a matrix having $n$ rows corresponding to said $n$ positions of said template and $(m+1)$ columns corresponding to said $m$ spacing measurements and said height reading for each of said $n$ positions of said template;
    l. calculating an average template height from each of said $n$ height readings;
    m. calculating a change in template height for each of said height readings from said height reading for each of a particular row of said matrix and said average template height;
    n. weighting said $m$ spacing measurements of each of said $n$ rows of said matrix by an associated one of said change in template heights;
    o. calculating an average of said $m$ weighted spacing measurement from said $m$ weighted spacing measurements for each of said $n$ rows of said matrix;
    p. calculating a change in spacing between said curved edge and said reflector surface for each of said $m$ weighted spacing measurement in each of said $n$ rows by said matrix from each of said $m$ weight spacing measurements in each of said N rows of said matrix and said average of said $m$ spacing measurements; and
    q. calculating said surface accuracy by calculating a root mean square reflector surface error from said change in spacing

2. A method according to claim 1, wherein said selected thickness of said spacers has a value which will enable said template to be rotated to said $n$ positions without said template hitting a high spot on said reflector surface.

3. A method according to claim 1, wherein said step of reading includes
    dividing said height reading obtained by said bench scope by the cosine of the angle between said target and said central axis.

4. A method according to claim 1, wherein said $m$ intervals are random.

5. A method according to claim 1, wherein said $m$ intervals are prescribed evenly spaced intervals.

6. A method according to claim 1, wherein said reflector surface is six foot in diameter, said $m$ intervals are equal to eight, and said $n$ positions of said template are taken every 30 degrees.

7. A method according to claim 1, wherein said (1) step of calculating includes the step of employing an equation $$H_{ar} = \sum_{1}^{n} \frac{H_i}{n}$$

where $H_{ar}$ is equal to said average height and $H_i$ is equal to any one of said $n$ height readings.

8. A method according to claim 1, wherein said ($m$) step of calculating includes the step of employing an equation $$\Delta H_j = \sum_{1}^{n} \frac{H_i}{n} - H_j,$$

where $\Delta H_j$ is equal to said change in template height for any one of said $n$ height readings, $H_i$ is equal to anyone of said $n$ height readings and $H_j$ is equal to any particular one of said $n$ height readings for which the change from said average height must be found, the sign of $\Delta H_j$ being plus when $H_j < H_{ar}$ and minus when $H_j > H_{ar}$, where $H_{ar}$ is equal to said average height.

9. A method according to claim 1, wherein said (o) step of calculating includes the step of employing an equation $$S_{ar} = \sum_{1}^{n \times m} \frac{S_{ij}}{n \times m},$$

where $S_{ar}$ is equal to said average of said $m$ weighted spacing measurements and $S_{ij}$ is equal to said weighted spacing measurement in the $i^{th}$ row and $j^{th}$ column of said matrix.

10. A method according to claim 1, wherein said (p) step of calculating includes the step of employing an equation $$\Delta S = \sum_{1}^{n \times m} \frac{S_{ij}}{n \times m} - S_{ij},$$

where $\Delta S$ is equal to said change in spacing and $S_{ij}$ is equal to said weighted spacing measurement in the $i^{th}$ row and $j^{th}$ column of said matrix.

11. A method according to claim 1, wherein
said (q) step of calculating includes the step of employing an equation $$\sigma = \left[ \frac{\sum_1^{n \times m} \left( \sum_1^{n \times m} \frac{S_{ij}}{n \times m} - S_{ij} \right)^2}{n \times m} \right]^{1/2}$$

where $\sigma$ is equal to the root mean square error of said reflector surface and $S_{ij}$ is equal to said weighted spacing measurement in the $i^{th}$ row and $j^{th}$ column of said matrix.

12. A method according to claim 1, wherein
said (1) step of calculating includes the step of employing an equation $$H_{av} = \sum_1^n \frac{H_i}{n}$$

where $H_{av}$ is equal to said average height and $H_i$ is equal to any one of said $n$ height readings;
said ($m$) step of calculating includes the step of employing an equation $$\Delta H_j = \sum_1^n \frac{H_i}{n} - H_j$$

where $\Delta H_j$ is equal to said change in template height for any one of said n height readings and $H_j$ is equal to any particular one of said n height readings for which the change from said average height must be found, the sign of $\Delta H_j$ being plus when $H_j < H_{av}$ and minus when $H_j > H_{av}$;
said (o) step of calculating includes the step of employing an equation $$S_{av} = \sum_1^{n \times m} \frac{S_{ij}}{n \times m}$$

where $S_{av}$ is equal to said average of said $m$ weighted spacing measurements and $S_{ij}$ is equal to said weighted spacing measurement in the $i^{th}$ row and $j^{th}$ column of said matrix;
said (p) step of calculating includes the step of employing an equation $$\Delta S = \sum_1^{n \times m} \frac{S_{ij}}{n \times m} - S_{ij}$$

where $\Delta S$ is equal to said change in spacing; and
said (q) step of calculating includes the step of employing an equation $$\sigma = \left[ \frac{\sum_1^{n \times m} \left( \sum_1^{n \times m} \frac{S_{ij}}{n \times m} - S_{ij} \right)^2}{n \times m} \right]^{1/2}$$

where $\sigma$ is equal to the root mean square error of said reflector surface.

* * * * *